Patented Dec. 28, 1937

2,103,504

UNITED STATES PATENT OFFICE 2,103,504

PURIFICATION OF CRUDE WAXY HYDROCARBONS

James M. Whiteley, Roselle, and Hans G. Vesterdal, Elizabeth, N. J., assignors to Standard Oil Development Company, a corporation of Delaware No Drawing. Application February 26, 1932, Serial No. 595,426

13 Claims. (Cl. 196—20)

This invention relates to waxy hydrocarbons, such as paraffin wax and petrolatum, and more particularly relates to a method of purifying the same.

Petroleum oils normally contain varying amounts of waxy hydrocarbons. These may be removed by chilling the oil whereby the wax is caused to precipitate, and then filtering, pressing, centrifuging or cold settling the oil whereby the wax may be separated therefrom. The wax so obtained is generally called slack wax. It contains small amounts of oil and varying quantities of impurities which impart to it a dirty yellow to brown color. The oil and impurities must be substantially removed before the wax is adapted for the normal uses to which it is put.

The usual method of removing the oil from slack wax comprises a sweating treatment, by which the wax is partially melted and the oil enclosed in the particles or crystals of wax is released or sweated out. The impurities are then removed by dissolving the sweated wax in a solvent, such as naphtha, and filtering the solution through clay, charcoal or similar adsorption media. Further refining may be accomplished by treatment with sulfuric acid.

This method of purifying crude wax has certain disadvantages. First, the sweating process carries a considerable portion of the wax into the foot's oil necessitating further chilling and sweating of this oil; second, it is difficult even by repeated sweating to recover all of the wax from the oil; and third, the acid and clay filtering treatment comprises a separate and relatively expensive operation.

We have now found a method by which these difficulties may be avoided and by which crude wax may be purified in substantially one operation. This method will be fully understood from the following description:

The crude wax is first dissolved in a liquefied normally gaseous hydrocarbon. The hydrocarbons suitable for this purpose comprise generally all those hydrocarbons the boiling point of which lies below 0° C. Among these are methane, ethane, propane, butane, ethylene, propylene, butylene, iso-butane, iso-butylene, cyclo-butane or any mixtures of these. The volume of liquefied hydrocarbon necessary will in general vary between 3 and 15 volumes per volume of crude wax.

At the start, pressure is preferably maintained high enough to retain the normally gaseous hydrocarbons in the liquid phase at the temperature of solution. Thus, for example, pressure should be between say 10 and 50 atmospheres, while temperature may range up to 200° F. or 250° F. or more.

Following solution of the crude wax in the liquefied hydrocarbon, any material remaining undissolved may be removed. If the wax initially is rich in asphaltic bodies these will be substantially insoluble in the liquefied hydrocarbon and may be readily separated from the solution by decantation or otherwise.

The clear solution is then chilled in order to induce the separation of the wax. The chilling may be effected by external means, or may be accomplished by evaporation of a portion of the liquefied hydrocarbon. If the latter means is adopted sufficient excess of liquefied hydrocarbon should be present at the start so that the required cooling will not consume all of the liquefied hydrocarbon.

The solution may be chilled immediately to below the separation temperature of all the wax, whereby the entire quantity of wax is obtained in one batch or may be chilled in steps in order to obtain a fractional precipitation. The latter method is preferred since wax fractions of different melting points are thus obtained directly. A further advantage of the chilling in steps is that most of the coloring matter will be found to be concentrated in the first fractions precipitated so that the remaining wax is substantially free from such material.

In the preferred method of operation, if the initial solution of crude wax in liquefied hydrocarbon is at a temperature of say 100° F. under a pressure of 20 atmospheres and contains 10 volumes of liquefied hydrocarbon for each volume of crude wax, the temperature may be reduced in the first step to say 50° F. by evaporation of a part of the liquefied hydrocarbon, whereupon a small amount of wax is caused to separate out. This wax may be removed conveniently by allowing it to settle and then drawing off the clear liquid. The temperature may then be reduced to say 10° F. by evaporation of a further portion of the liquefied hydrocarbon whereupon additional wax is caused to separate out. This may be removed as before, and temperature again reduced in successive stages to 0, −20° F., −40° F. and so on with removal of precipitated wax after each chilling until substantially all the wax has been separated from the oil. It will be understood that these temperatures are merely mentioned to give an idea as to how the process may be carried out and that temperature may be reduced in each step to any point necessary to obtain a wax of a particular melting point.

Following the separation of the various fractions of wax, these may be further purified if necessary by washing with fresh liquefied hydrocarbon. In general such washing will only be necessary for the first one or two fractions precipitated since these contain the greater amount of impurity and coloring material.

The wax obtained by this method has a pure white color and is highly refined and free from oil. A still further purification may be effected, if desired, by redissolving the wax in liquefied hydrocarbon and filtering the solution through clay, silica gel, charcoal or other absorbent medium. This additional treatment, however, would only be necessary for obtaining the greatest degree of purity. For all ordinary purposes the wax as precipitated initially is sufficiently pure.

This method is applicable to all types of waxy hydrocarbons whether obtained from petroleum oils, shale oils, mineral oils or from coal tar, pitches, bitumens or other carbonaceous materials.

A particular advantage of our method is that the wax when precipitated in liquefied hydrocarbon settles very rapidly, so that only a short time is required between each chilling. This is of particular importance with petrolatum which as ordinarily obtained from petroleum oils is practically impossible to separate by filtering or centrifuging, and settles only after prolonged periods. In our method, regardless of whether the waxy hydrocarbon material is initially amorphous or crystalline, it settles rapidly out of the liquefied hydrocarbon solution.

This invention is not limited by any theory of the mechanism of the precipitation nor by any details or figures which have been given merely for purposes of illustration but is limited only by the following claims in which we wish to claim all novelty inherent in the invention.

We claim:

1. The method of purifying crude waxy hydrocarbons which comprises dissolving the crude material in a liquefied normally gaseous hydrocarbon, removing any material remaining undissolved, then chilling the solution whereby wax is caused to precipitate, and recovering the wax so precipitated.

2. Process according to claim 1 in which the liquefied hydrocarbon comprises propane.

3. Process according to claim 1 in which the liquefied hydrocarbon comprises ethane.

4. Process according to claim 1 in which the liquefied hydrocarbon comprises a mixture of propane and ethane.

5. Process according to claim 1 in which the crude waxy material is incorporated with from 3 to 15 volumes of liquefied hydrocarbon.

6. Process according to claim 1 in which the solution is chilled by evaporation therefrom of a portion of the liquefied hydrocarbon.

7. The method of obtaining highly refined waxy hydrocarbons from crude wax which comprises dissolving the crude wax in a liquefied normally gaseous hydrocarbon, progressively chilling the solution in succesive steps whereby increments of the waxy hydrocarbons are precipitated and removing the precipitated material after each chilling step.

8. Process according to claim 7 in which the crude wax is dissolved in liquid propane.

9. Process according to claim 7 in which the crude wax is dissolved in a mixture of liquid propane and ethane.

10. Process according to claim 7 in which the progressive chilling is accomplished by evaporation of a portion of the liquefied hydrocarbon.

11. Process for obtaining a plurality of purified wax fractions of different melting points from crude wax which comprises dissolving the crude wax in a liquefied normally gaseous hydrocarbon, removing any colored bodies and impurities remaining undissolved, chilling the solution to a temperature at which a small portion of the wax is caused to precipitate, removing the precipitated wax, chilling the solution to a temperature at which a further quantity of wax is caused to precipitate, removing the precipitated wax, repeating the chilling and wax removal steps until substantially all of the wax has been precipitated, and removing the liquefied normally gaseous hydrocarbon from the several wax fractions.

12. Process for obtaining purified wax fractions from crude petrolatum which comprises dissolving the crude petrolatum in propane, removing colored bodies and impurities remaining undissolved, chilling the solution to a temperature at which the wax is caused to precipitate but the oil remains dissolved in the propane, allowing the wax to settle, separating the wax from the solution and removing the propane therefrom.

13. Process according to claim 1 in which the precipitated wax is redissolved in a liquefied normally gaseous hydrocarbon, and the solution is filtered through a bed of clay.

JAMES M. WHITELEY.
HANS G. VESTERDAL.